United States Patent
Lewandovski

(10) Patent No.: US 11,273,991 B2
(45) Date of Patent: Mar. 15, 2022

(54) OVERHEAD CONVEYOR SYSTEM

(71) Applicant: OCS HOLDING AB, Borås (SE)

(72) Inventor: Jan Lewandovski, Borås (SE)

(73) Assignee: OCS HOLDING AB, Borås (SE)

(*) Notice: Subject to any disclaimer, the term of this patent is extended or adjusted under 35 U.S.C. 154(b) by 0 days.

(21) Appl. No.: 17/268,495

(22) PCT Filed: Sep. 3, 2019

(86) PCT No.: PCT/EP2019/073490
§ 371 (c)(1),
(2) Date: Feb. 15, 2021

(87) PCT Pub. No.: WO2020/049003
PCT Pub. Date: Mar. 12, 2020

(65) Prior Publication Data
US 2021/0261347 A1    Aug. 26, 2021

(30) Foreign Application Priority Data

Sep. 3, 2018 (SE) .................................. 1851041-2

(51) Int. Cl.
*B65G 35/06* (2006.01)
*B61B 10/02* (2006.01)
(Continued)

(52) U.S. Cl.
CPC .............. *B65G 35/06* (2013.01); *B61B 10/02* (2013.01); *B65G 9/006* (2013.01); *B65G 17/20* (2013.01)

(58) Field of Classification Search
CPC ...... B65G 35/06; B65G 35/063; B65G 17/20; B65G 19/025; B65G 47/61; B61B 10/02; B61B 10/025
(Continued)

(56) References Cited

U.S. PATENT DOCUMENTS 3,759,189 A    9/1973  Desilets
3,807,314 A *  4/1974  Slemmons ............. B65G 17/20
                                                    198/370.13
(Continued)

FOREIGN PATENT DOCUMENTS

DE    22 43 315    3/1973
EP    1 646 571    4/2006
(Continued)

OTHER PUBLICATIONS

International Search Result issued in PCT/EP2019/073490, dated Sep. 3, 2020, pp. 1-7.
(Continued)

*Primary Examiner* — Mark A Deuble
(74) *Attorney, Agent, or Firm* — Jeffrey S. Melcher; Melcher Patent Law PLLC

(57) ABSTRACT

An overhead conveyor system with an elongate box girder (9) having a first inner space with rails (12) and a second elongate inner space comprising an endless driven drive element (5, 6) is provided with at least one carrier (14, 14') adapted to run on said rails (12) wherein said carrier is provided with an elongated body (C) supporting at least one friction driver (15), wherein said at least one friction driver is in the form of a friction arm assembly (19) with an upper end (20), a lower end (21) and an intermediate portion (22) between said upper and lower ends, said upper end comprising a friction shoe (25) adapted to be pressed upwards by the force of gravity towards engagement with the drive element (5) so as to transfer drive to the carrier.

18 Claims, 9 Drawing Sheets

(51) Int. Cl.
*B65G 9/00* (2006.01)
*B65G 17/20* (2006.01)

(58) Field of Classification Search
USPC .......................................... 198/867.13, 465.4
See application file for complete search history.

(56) References Cited

U.S. PATENT DOCUMENTS

| | | | |
|---|---|---|---|
| 3,986,458 A | 10/1976 | Kling | |
| 4,354,435 A * | 10/1982 | Wakabayashi | B61B 10/025 |
| | | | 104/172.4 |
| 6,431,347 B1 * | 8/2002 | Gossner | B61B 10/025 |
| | | | 104/172.4 |
| 7,377,377 B2 * | 5/2008 | Christiansson | B61B 10/025 |
| | | | 198/465.4 |
| 7,686,156 B2 * | 3/2010 | Tabler | B65G 35/063 |
| | | | 198/465.4 |
| 8,800,745 B2 * | 8/2014 | Spangler | B65G 35/063 |
| | | | 198/345.3 |
| 2006/0016364 A1 | 1/2006 | Johansson | |
| 2019/0017847 A1 * | 1/2019 | Han | B65G 35/06 |

FOREIGN PATENT DOCUMENTS

| | | |
|---|---|---|
| FR | 2 264 740 | 10/1975 |
| GB | 737 265 | 9/1955 |
| WO | 2005/007542 | 1/2005 |

OTHER PUBLICATIONS

Written Opinion issued in PCT/EP2019/073490, dated Sep. 3, 2020, pp. 1-13.

\* cited by examiner

OVERHEAD CONVEYOR SYSTEM

TECHNICAL FIELD

The present invention relates generally to overhead conveyor systems of the type that comprises at least one carriage which is drivably suspended from a rail in a girder system containing a drive belt by a carrier.

BACKGROUND

European patent EP1646571 describes a dual-carrier conveyor system where the carriers are propelled along rails by contact with an endless drive belt running above the rails. Each carrier is driven by a pair of drivers that are preloaded by a spring to move upwards into contact with the endless drive belt. In one embodiment of a driver, the driver comprises a spring-loaded pin which engages in holes in the drive belt. In a second embodiment of a driver the driver is a friction driver comprising an essentially flat upper surface adapted to be brought into frictional engagement with the drive belt by a spring which forces the driver upwards with a predefined, substantially constant, spring force which generates sufficient friction between the friction driver and drive belt to drive carrier forward. The first embodiment of a driver has a positive engagement between the spring-loaded pin and holes in the drive belt which provide a good transmission of drive forces without permitting any slippage between the driver and the drive belt. This is advantageous when high drive forces are needed, for example, when going up a slope, and also when a braking force needs to be exerted on a carrier, for example when going down a slope to prevent the carrier from descending out of control. However, such an arrangement prevents freewheeling of the carriage and does not allow a user to push a carriage at a faster or slower speed than that of the drive belt. The second embodiment of a driver with the spring-loaded friction surface provides lower drive forces and allows the driver to slip with respect to the drive belt—which is desirable if an object obstructs or collides with the carriage or the load supported on the carriage. It is also useful if a user wishes manually to push or pull the carrier at a speed which is higher or greater than that of the drive belt. However, such a friction arrangement does not provide a positive engagement between the driver and drive belt which means that the maximum force that can be transmitted to the driver is limited by the upwardly-directed component of the spring force provided by the spring. This upwardly directed component of the spring force decreases whenever the carrier travels up or down a slope, thus reducing the drive or braking force when it is needed most.

An embodiment of this system comprises a carriage with one of each type of driver, i.e. one driver with a spring-loaded pin and another driver with a spring-loaded friction driver. Such a system provided direct driving but is unable to allow slippage between the drivers and the drive belt.

Providing a carriage with two spring-loaded friction drivers will allow slippage between the belt and drivers but suffers from the disadvantage that when the belt climbs or descends a slope the angle of contact of the friction drive to the drive belt is no longer vertical and the upward-directed component of the spring-loading force proved by the spring to the friction drive is reduced, thereby possibly leading to unwanted slippage between the driver and the drive belt. This can occur if the carriage is heavily loaded or the spring-loading force is weakened for example by wear on the friction surface or weakness in the spring providing the spring loading.

An object of the present invention is to provide a driver and an overhead conveyor system which overcomes at least some of the problems of the prior art drivers and overhead conveyor systems.

This and other objects are achieved with a friction driver according to claim 1 and overhead conveyor system according to the second independent claim.

According to the present invention, each carrier is thus driven by at least one driver that is preloaded into contact with an endless drive element, arranged above the rails on which the carrier is propelled, by means which maintain or increase the contact force when a driver is in contact with an inclined portion of a drive belt. An effect of this drive principle is that it always can allow slippage of a driver with respect to the drive belt if needed, for example if the movement of a carrier is obstructed, and thereby can avoid the unwanted transmission of forces acting on the carrier to the drive belt, while still providing a reliable drive force when a carrier climbs an incline.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The invention will now be described in more detail with reference to an embodiment which is schematically illustrated in the accompanying drawings.

DETAILED DESCRIPTION OF THE INVENTION

Figure 1:
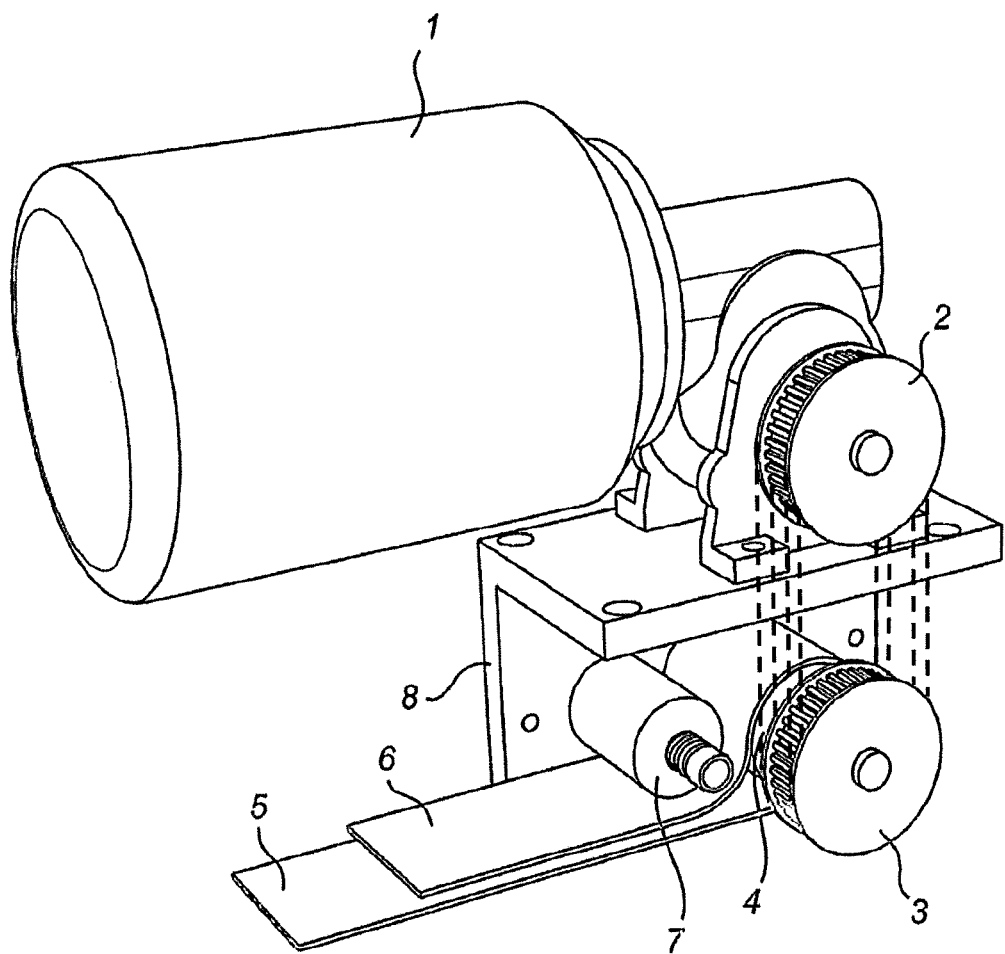
FIG. 1 is a perspective view of a portion of the drive for a conveyor system according to the invention.

FIG. 1 is a perspective view of a portion of one embodiment of the drive of a conveyor system according to the invention, schematically illustrating a drive motor 1 driving a first gear drive 2, which via a positive drive belt (shown by dashed lines) transfers the drive force to a second gear drive 3, which in turn is non-rotatably connected to a drive and/or terminal roller 4, which drives an endless drive element, e.g. a continuous belt, in a driving run 5 and a return run 6. Normally the drive element runs in only one direction and in the following the terms front or forward, back or rear are in relation to this normal direction of motion which is in the X-direction. The vertical Z-direction is orthogonal to the X-axis downwards and the transverse Y-direction is orthogonal to both the X- and Z-axis to the side as shown in the figures. Thus, a front carrier on a drive carriage is the carrier which is before the rear carrier when a carriage moves in the X-direction, the carrier runs on rails positioned in the Z-direction below the drive belt and body of the carrier has a front end and a rear end wherein the rear end is behind the front end in the X-direction. The drive element is illustrated in the figures as a drive belt which is kept tensioned by means of tensioning rollers 7. This drive arrangement is attached to a frame yoke 8 which is partially shown in the Figure.

Figure 2:
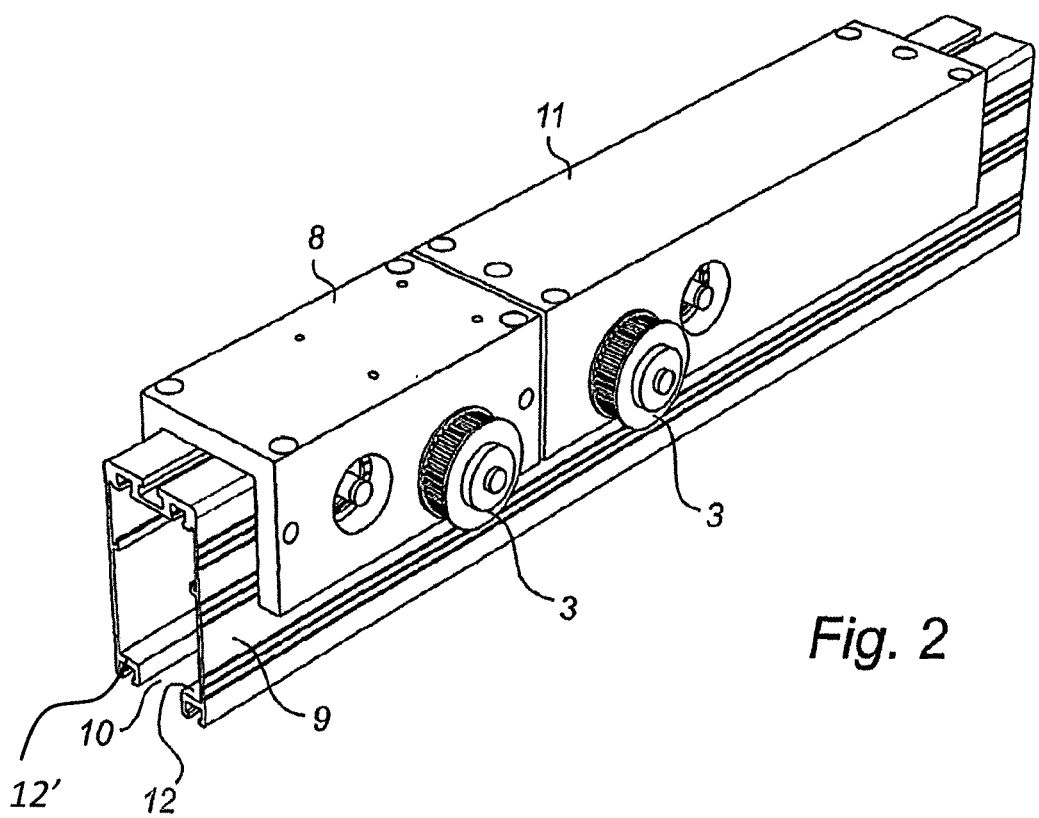
FIG. 2 is a perspective view of a portion of a main girder included in the conveyor system according to the invention.

FIG. 2 shows schematically a portion of an elongated girder 9 which may be included in the inventive conveyor system. This girder is a hollow box girder 9 of quadratic cross-section with a longitudinal, preferably centrally arranged slot-like opening 10 which in the mounting position is positioned in the downwardly directed lateral surface. A frame yoke 8 supporting the motor (not shown) and the second lower gear drive 3 may be fixed to the upper side of the girder 9. The frame yoke 8 straddles the girder 9, and the figure shows a second similar frame yoke 11 fixed to the girder 9 in the axial direction after the first frame yoke and, like the first frame yoke, it is provided with a gear drive 3 and drive and/or terminal rollers (not shown) and also a second endless belt loop. By arranging a positive drive belt between the two gear drives 3, the motor 1 can drive the first as well as the second belt loop. In this manner, it is possible to keep the length of each belt loop short enough such so that any slack thereof is reasonable and does not interfere with the function of the system.

Figure 3:
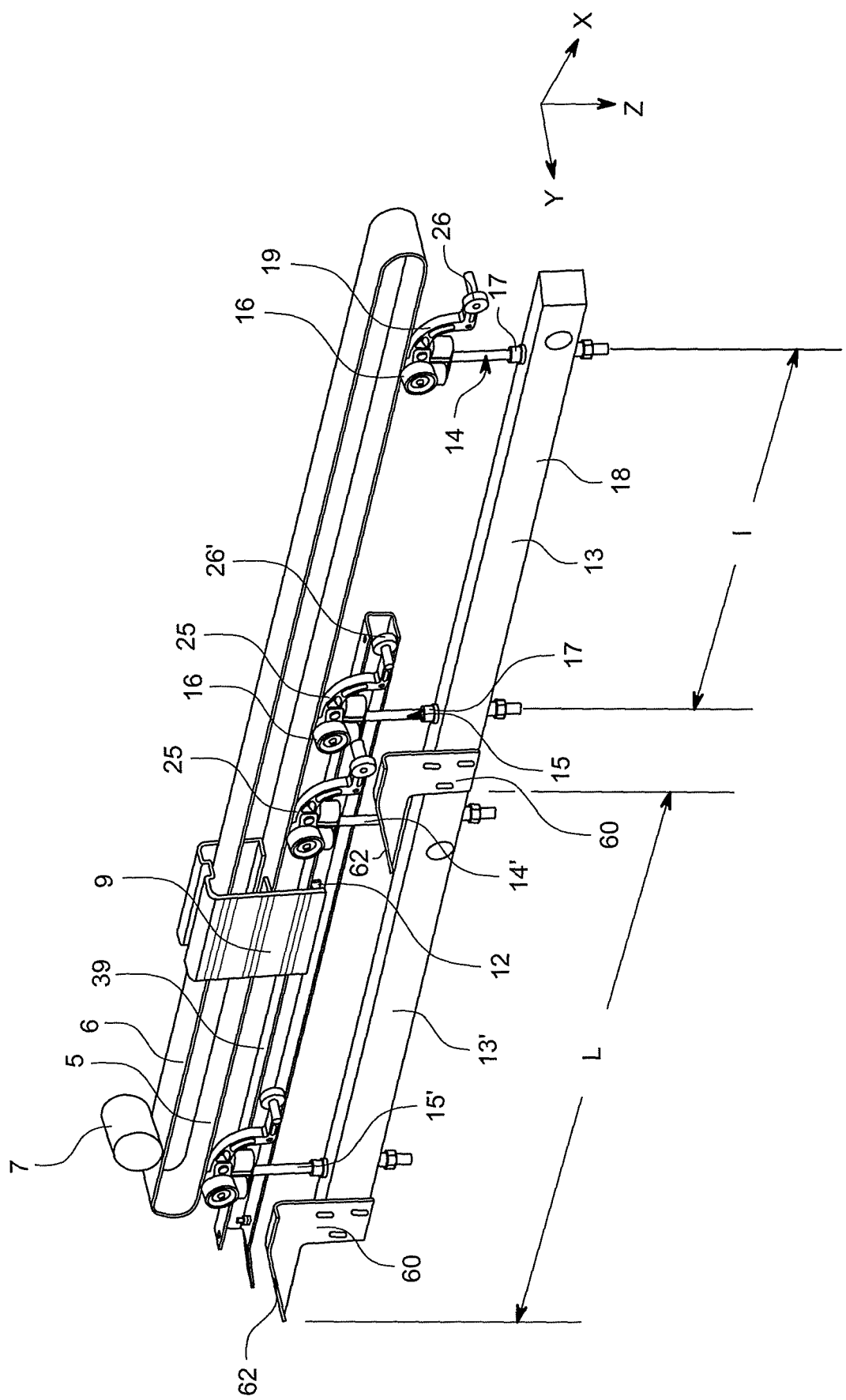
FIG. 3 is a perspective view partly cut-away view of a conveyor system and two drive carriages in accordance with the present invention.
Figure 4:
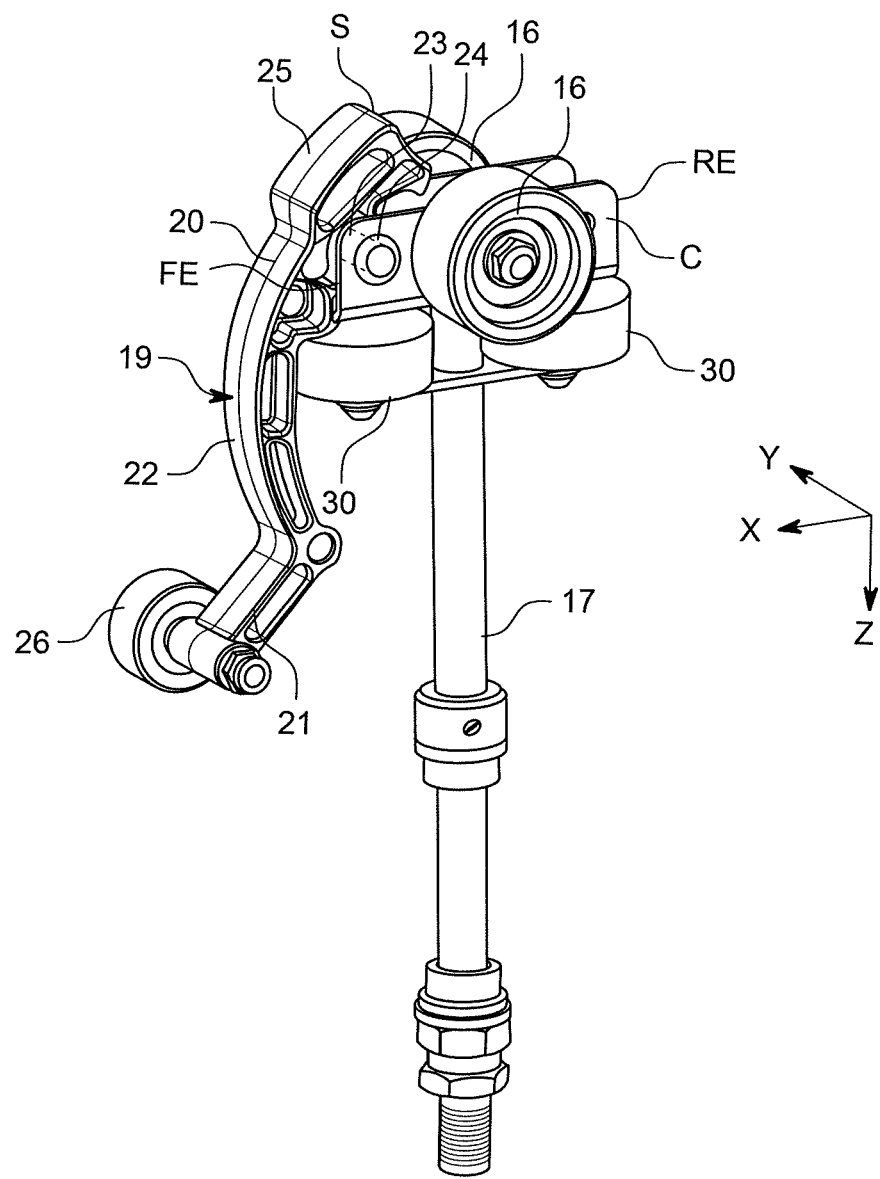
FIG. 4 is a perspective view of a carrier according to an embodiment of the invention.
Figure 5C:
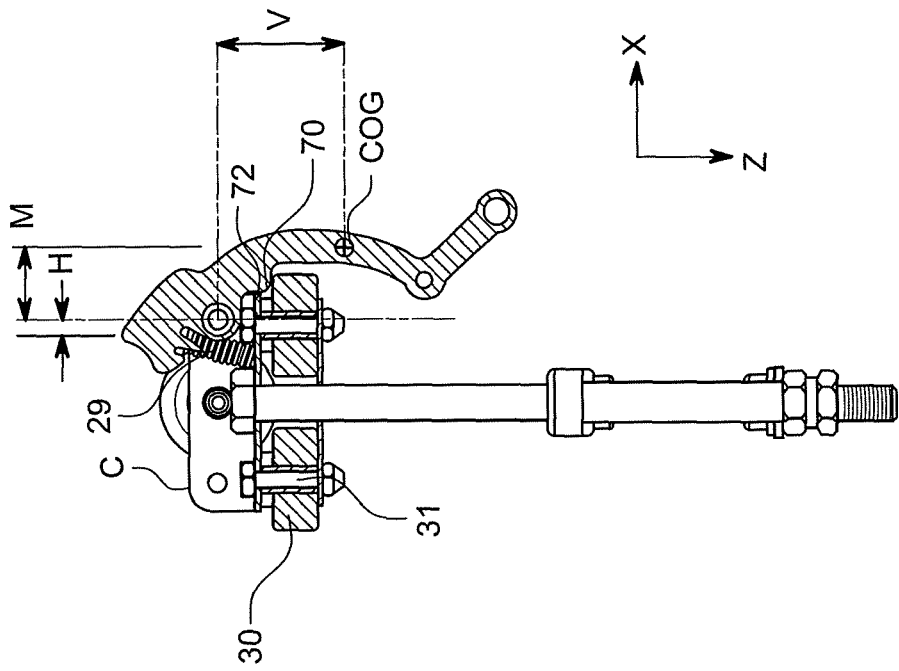
FIG. 5c) is a partly sectioned lateral view from the right of the carrier of FIG. 4.
Figure 5B:
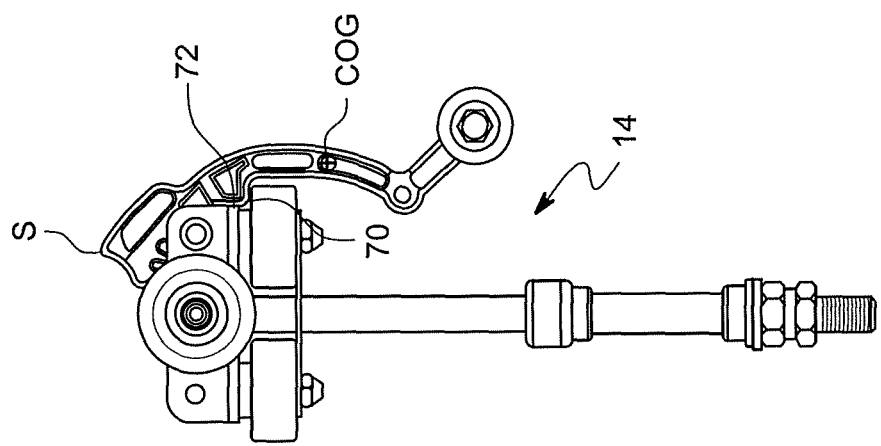
FIG. 5b) is a lateral view from the right of the carrier of FIG. 4.
Figure 5A:
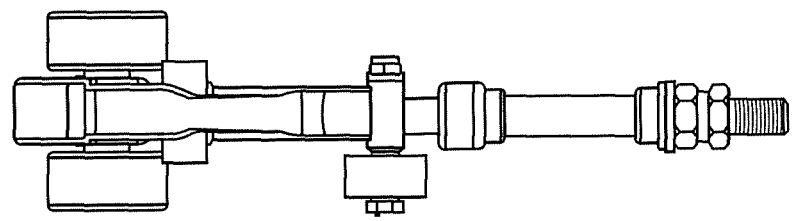
FIG. 5a) is a front view of the carrier of FIG. 4.
Figure 5D:
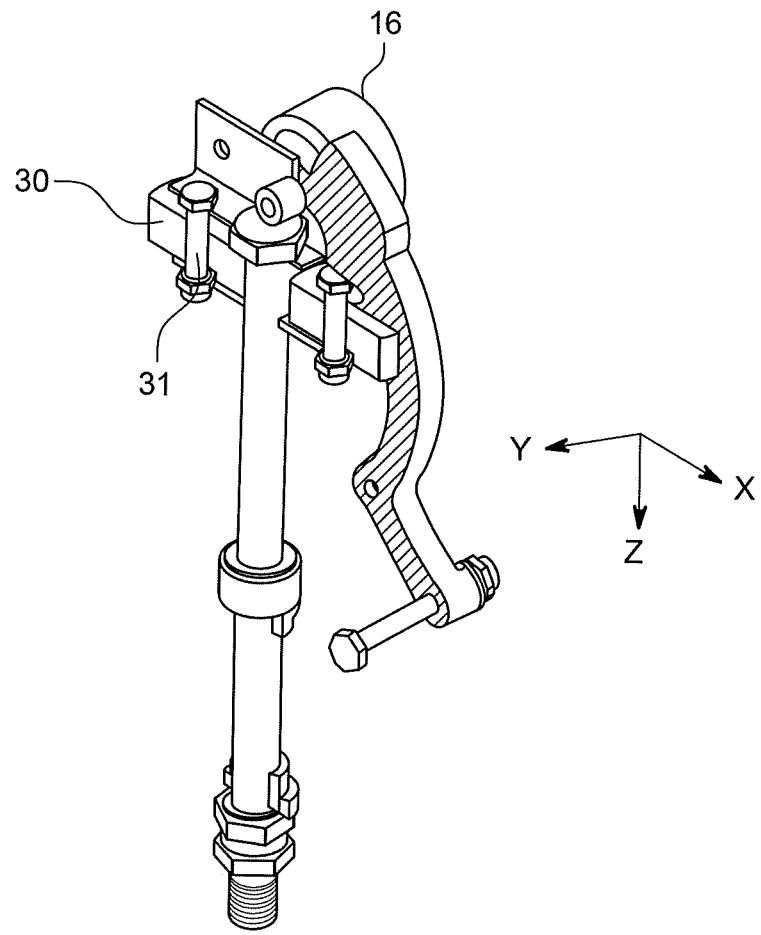
FIG. 5d) is a partly sectioned perspective view corresponding to that of FIG. 5 of the carrier of FIG. 4.
Figure 5E:
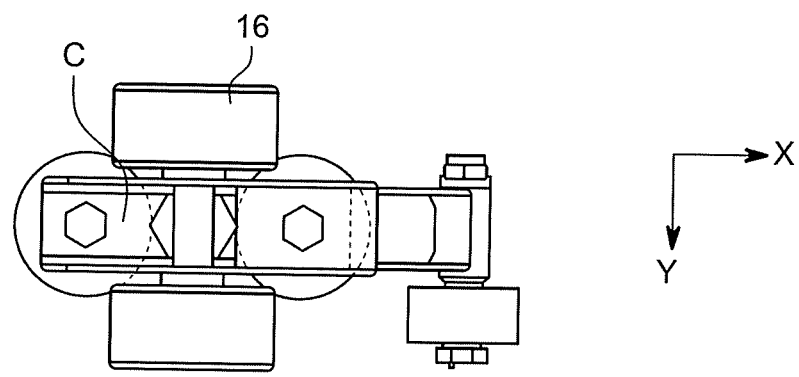
FIG. 5e) is a plan view of the carrier of FIG. 4.

At the lower slot-like opening 10 in the girder there are arranged inwardly directed flange portions 12, with upper surfaces 12' which serve as rails for wheels 16 of the two drive carriages 13, 13' schematically shown in perspective in FIG. 3. Each drive carriage comprising a front carrier 14, 14' and a rear carrier 15, 15'. As shown in FIGS. 4 and 5a) to 5e) each carrier has a body C with a front end FE which extends from a rear end RE in the X-direction. Each body in the shown examples is provided with at least two laterally-positioned (i.e. positioned transverse the body C) running wheels 16 which are arranged so that there is at least one wheel on either side of the central longitudinal axis of the body. These running wheels are arranged to roll on the upper surfaces 12' of the flange portions 12 shown in FIG. 2. Each of the front and rear carriers 14, 15 is provided with a downwardly (i.e. In the Z-direction) extending load carrier pin 17 which, when the drive carriage 13 is arranged in the girder 9, extend through the slot-like opening 10 of width W mm. The pairs of front and rear carriers are interconnected by a longitudinally-extending frame 18, which in the example shown in FIG. 3 is quadrilateral but which could be of any shape, whereby load carrier pins of the carriers 14, 15, respectively 14', 15' are held at a constant centre-to-centre distance I from each other. The total length of a drive carriage is L which, of course, is greater than I.

At least one carrier and preferably two carriers 14, 14', 15, 15' from each drive carriage is provided with a friction driver, in the form of a pivotable friction arm assembly 19.

The friction arm assembly has an upper end 20, a lower end 21 and an intermediate portion 22 between said upper and lower ends. The upper end 20 has a through hole 23 arranged around a transverse, horizontal, pivot axis 24 on the body C of the respective carrier so that the friction arm assembly can pivot around said pivot axis. The uppermost surface S of the upper end of each friction arm assembly is intended to be in driving contact with the drive belt during normal use. The uppermost surface S comprises a preferably high friction portion such as friction shoe 25 which can provide a high friction contact with the drive belt. The lower end of each friction arm assembly optionally comprises a guide surface 26, 26' which can cooperate with control means in the system to force the friction shoe into or out of contact with the drive belt. A guide surface may be in the form of a guide wheel as shown in the figure or a curved and/or sloping guide surface. Preferably the guide surface 26 of the front carrier is offset to one side of the longitudinal axis of the body C, for example on the right side (the positive Y-direction from the centreline of the body) in the normal direction of motion, and the guide surface 26' of the rear carrier is offset to the other side of the body C, for example on the left side (the negative Y-direction from the centreline of the body). As described in more detail later, this use of guide surfaces 26, 26' on different sides of the front carrier 14, 14' and rear carriers 15, 15' allows some control means, such as control surfaces arranged in the conveyor system, to interact only with the guide surface 26 on a front carrier 14 while other control surfaces can only interact with guide surface 26' on a rear carrier 15.

In normal use, the weight of the portion of the friction arm assembly below the axis 24 is greater than the weight of the friction arm assembly above the axis 24 so that the centre of gravity (COG) of the friction arm assembly is below the pivot axis 24 and the uppermost surface S of the friction arm assembly which is intended to come into driving contact with the drive belt is biased upwards by the force of gravity into driving contact with said drive belt.

As an alternative to, or in addition to, the weight of the portion of the friction arm assembly below the axis 24 being greater than the weight of the friction arm assembly above the axis 24 so that the centre of gravity of the friction arm assembly is below the pivot axis 24, the centre of gravity of the friction arm assembly may be displaced in one direction along the horizontal longitudinal axis (for example, the positive X-direction from the centre of the pivot) of the carrier from the pivot axis 24 while the uppermost surface of the friction shoe which is intended to come into driving contact with the drive belt is displaced in the opposition direction (for example, the minus X-direction from the centre of the pivot) along the longitudinal axis of the carrier from the pivot axis.

Displacing the centre of gravity to one side of the pivot axis means that, in the absence of any other forces, due to the force of gravity acting at the centre of gravity of the friction arm assembly, the friction shoe and its uppermost surface S is biased upwards i.e. towards a drive belt. When the centre of gravity of the friction arm is lifted by control surfaces it will also be displaced horizontally in one direction while the uppermost surface of the friction shoe which is intended to come into driving contact with the drive belt will be lowered and moved horizontally in the opposite direction.

Gradually raising or lowering the friction arm will gradually bring the uppermost surface of the friction arm out off, respectively, into contact with the drive belt and allow smooth disengagement and engagement of the drive.

In an alternative arrangement, it is conceivable that both the uppermost surface of the friction shoe which is intended to come into driving contact with the drive belt and the centre of gravity of the friction arm are positioned during normal use above the pivot axis 24, but on opposite sides of it. For example, the friction arm could be U-shaped, with the pivot axis in the base of the U, the uppermost surface of the friction shoe which is intended to come into driving contact with the drive belt at the top of one arm of the U and the centre of gravity in the other arm of the U. As the centre of gravity is on one side of the pivot and the uppermost surface of the friction shoe which is intended to come into driving contact with the drive belt on the other side of the pivot, the tendency of the centre of gravity to go downwards under the force of gravity will cause the uppermost surface of the friction shoe which is intended to come into driving contact with the drive belt to be biased upwards. Preferably mechanical stops or other means are arranged in suitable positions to limit the range of movement of the fraction arm, for example to prevent the friction arm from rotating inverted, thereby facilitating assembly and handling of the friction arm assembly.

Figure 6:
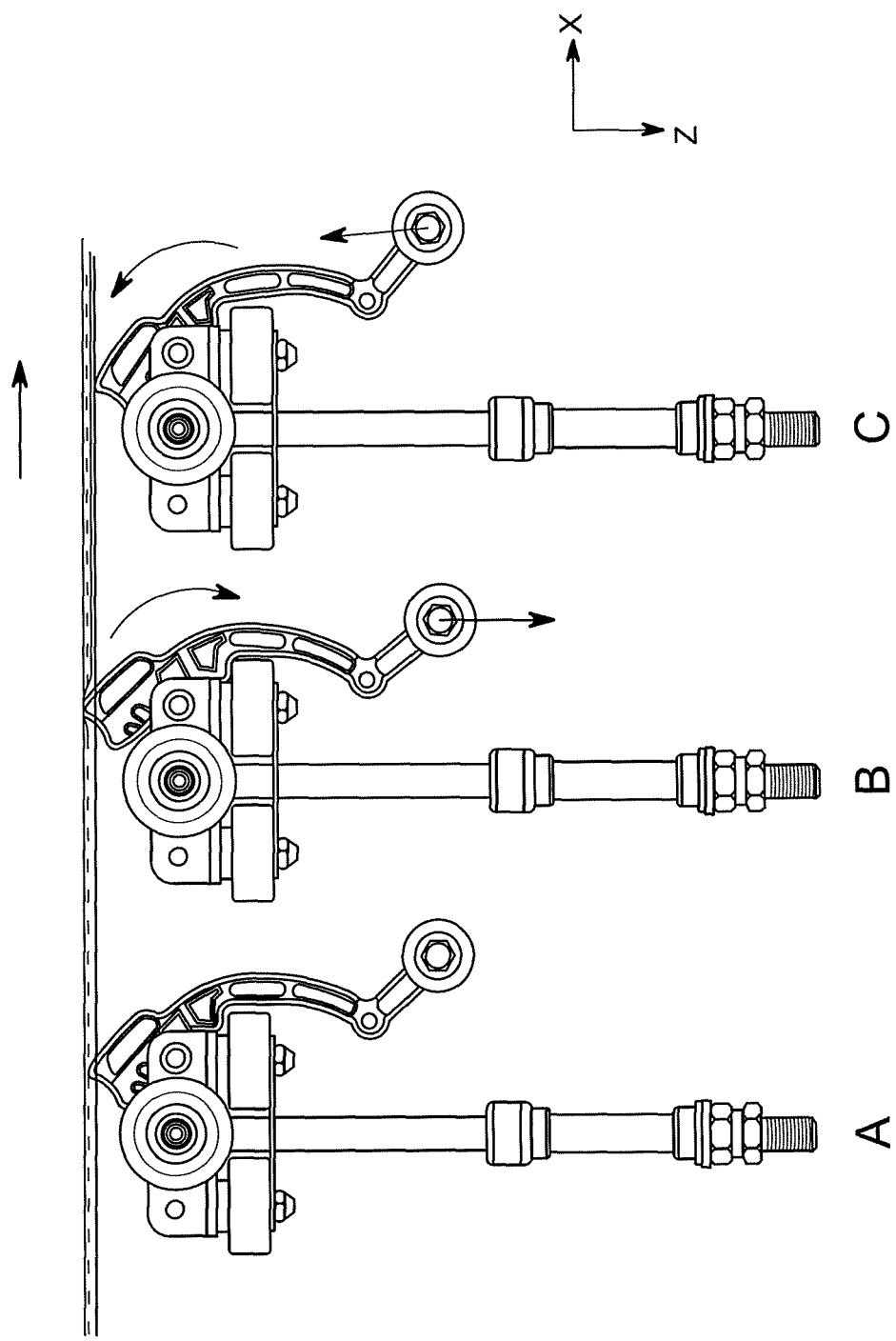
FIG. 6 is a schematic lateral view of the carrier of FIG. 4 in resting, driving and disconnected positions.

Optionally a preload spring 29 or the like may be additionally provided between the body C (and/or the downwardly extending load carrier pin 17 and/or the drive carriage 13) and the friction arm assembly to push the friction shoe away from the body C. This holds the friction arm assembly in a stable position when the carrier is not connected to a conveyor system and eases handling of the carriers. Such a preload spring also provides some preloading and bias of the friction shoe towards a drive belt. The force provided by the preload spring preferably should be limited in order that the preload pressure alone is unable to cause the friction shoe to engage with the drive belt with sufficient force to drive the carrier. This ensures that driving of the carrier can only take place when the weight of the friction arm is added to any preload generated by a spring or the like and allows soft starting and stopping of the carriage by gradually lowering and raising the friction arm into and out of driving contact with the drive belt. Preferably the proportion of the preloading force of the friction shoe towards the drive belt when the carrier is horizontal provided by a preload spring is equal to or less than 50% of the total preload force provided by the spring and the weight of the friction arm assembly. More preferably the proportion is equal to or less than 30% of the total force and even more preferably is less than or equal to 20% of the total force provided by the spring and friction arm assembly. Preferably the shape of the friction arm assembly is arranged so that during use, even when ascending or descending the steepest slope in the system (which normally is limited to an angle which is equal to or less than 45° from the horizontal), the centre of gravity of the friction arm assembly is a horizontal distance M in front of the centre of the axis 24. This distance M act as a moment arm so that due to the influence of gravity (and any preload spring) the friction shoe is biased to rotate about the pivot in the direction towards the front of the carrier i.e. in the normal direction of travel. The horizontal distance M varies during use as the friction arm assembly pivots about the axis 24. Preferably the horizontal distance M from the centre of gravity of the friction arm assembly and the centre of the axis 24 in the direction away from the body C is always greater than or equal to 1 mm, more preferably greater than or equal to 3 mm, even more preferably greater than or equal to 5 mm and most preferably equal to or greater than 10 mm. Preferably the shape of the friction arm assembly is arranged so that when the carrier ascends a slope the horizontal distance M between the centre of gravity and the pivot increases, thereby forcing the friction shoe upwards with an increased force and reducing the possibility of slippage. This can be achieved by arranging the COG of the friction arm assembly so that it is in front of the pivot a distance M and below the pivot a distance V. Preferably V is equal to or greater than 5 mm, more preferably equal to or greater than 10 mm and even more preferably equal to or greater than 15 mm. FIG. 6 shows, in position A, the friction arm assembly resting lightly against the drive belt. This may occur when the belt is stationary. Rotating the lower end of the friction arm assembly downwards, as shown in FIG. 6, position B, will push the friction shoe against the drive belt with a higher contact force, thereby increasing the friction between the friction shoe and drive belt and increasing the drive force. This position may be achieved by actively lowering the lower end of the friction arm assembly by means of a control surface interacting with the friction arm assembly or it may occur by the friction between the drive belt and the friction shoe pulling the friction shoe forwards. As long as the friction shoe is behind the pivot, the belt is moving, and the friction shoe is in contact with the belt, then a self-locking effect occurs which holds the friction shoe in contact with the belt. If the resistance to motion of the carrier occurs, e.g. by an increased load or an upward slope or contact with an obstacle, then slippage will occur, i.e. the drive belt will move faster than the friction shoe. The drive belt will push the friction arm assembly in the direction of travel of the belt. This will cause the friction arm assembly to pivot in the direction of travel which will raise the friction shoe into firmer contact with the drive belt. This, in turn, increases the friction force between the friction shoe and drive belt, which steadily reduces slippage until an equilibrium is achieved and the carrier and belt move at the same speed (or, if the load is too high, with the minimum amount of slippage).

Lifting the lower end of the friction arm assembly, as shown in position C in FIG. 6, will move the friction shoe away from the drive belt, thereby reducing the friction between the drive belt and friction shoe and reducing the drive force transmitted to the drive carriage by the carrier. In FIGS. 6A-6C the distance between the stop surfaces 70 and 72 are exaggerated for ease of viewing.

Preferably, when a friction arm assembly is intended for driving in the forward direction the friction shoe is positioned on the friction arm assembly and the friction arm assembly is shaped so that when the friction shoe is in driving contact with the drive belt the point of contact of the friction shoe with the drive belt is always behind the pivot at the same time as the centre of gravity of the friction arm assembly is in front of the pivot. To prevent the contact point of the friction shoe with the drive belt from going over centre, i.e. moving in front of the pivot, the carrier can have a stop which limits the forward pivoting of the friction surface. This can be in the form of a first stop surface 70 on the friction arm assembly which comes into contact with a second stop surface 72 on the body C of the carrier and which together prevent the friction surface from pivoting into a position in front of the central axis of the pivot. Preferably the stop surfaces are arranged so that the distance H between the most forward position of the contact surface S of the friction shoe and a drive belt is preferably equal to or greater than 2 mm, more preferably equal to or greater than 3 mm and most preferably equal or greater than 5 mm. This ensures that slippage may occur between the friction shoe and drive belt. This may be necessary when the movement of the carrier is prevented by an obstacle or if a user wishes to manually move the carrier at a speed which is different to that of the drive belt.

All carriers 14, 14', 15, 15' are preferably provided with two or more guide wheels 30 which can rotate about vertical axis 31, or other guide means such as sliders, which, when the carriers are mounted into the girder 9, may rest against the vertical inner wall thereof and thus prevent the drive carriage 13 from being set into lateral oscillations in the girder.

Figure 7:
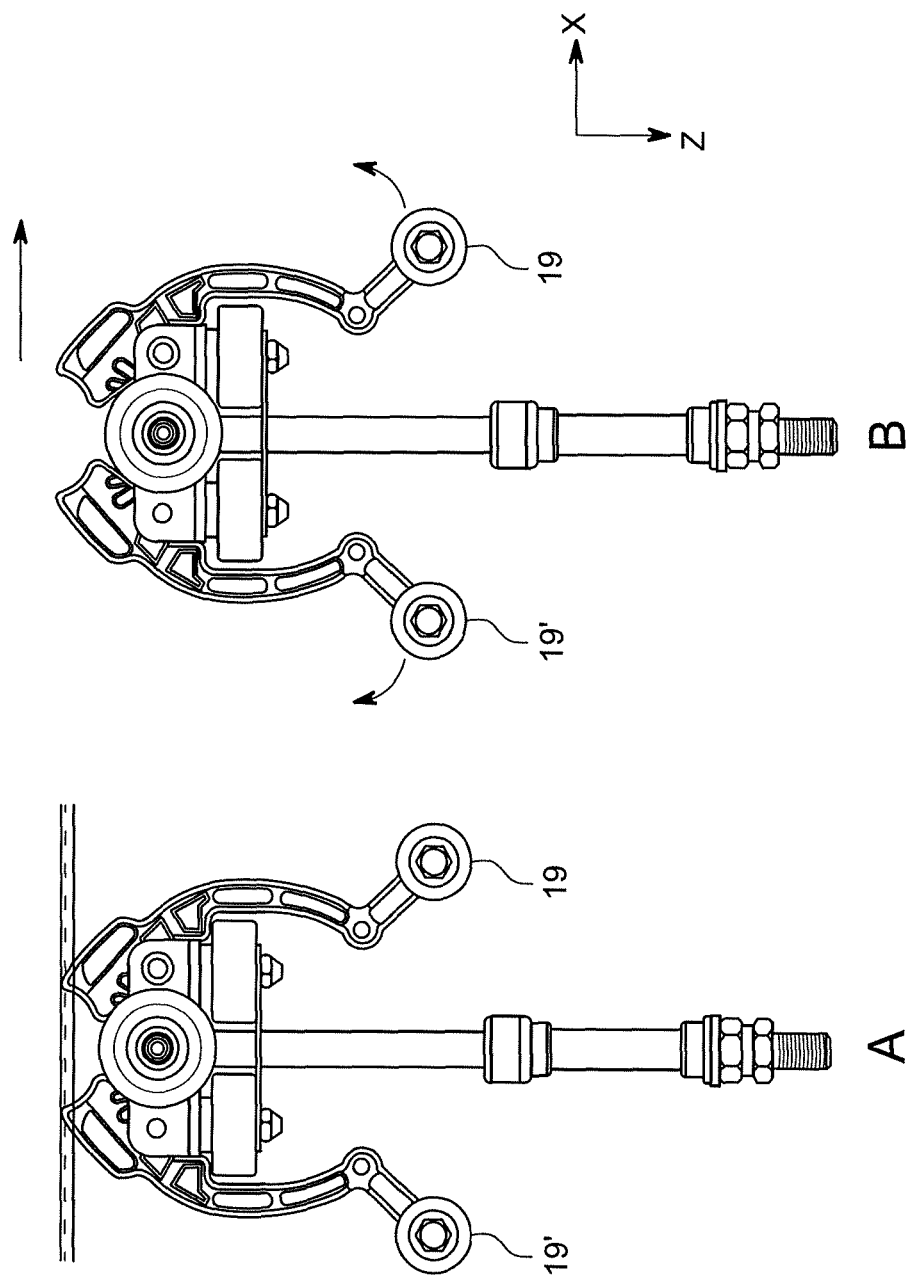
FIG. 7 shows a further embodiment of a carrier in accordance with the present invention.

As shown in FIG. 7, a carrier can be provided with two friction arm assemblies—a front friction arm assembly 19 and a rear friction arm assembly 19'. Both friction arm assemblies are preferably substantially identical, with the front friction arm assembly facing forward as described above while the rear friction arm assembly 19' faces backwards. This arrangement allows the carrier to be driven in both the forward direction, in which case the front friction arm assembly 19 is in driving contact with the drive belt and the rear friction arm assembly 19' provides little or no driving force, and in the reverse direction, in which case the rear friction arm assembly 19' is in driving contact with the drive belt and the front friction arm assembly 19 provides little or no driving force. Such an arrangement is self-locking and will not free-wheel or be able to be manually pushed or pulled because one of the friction arm assemblies will always be in friction contact with the drive belt. In order to allow such movements, the friction arm assemblies must be taken out of contact with the drive belt. This can be achieved by manually or mechanically lifting the friction arm assembly which tends to oppose the desired movement i.e. the rear friction arm assembly when pushing the carrier forwards and the front friction arm assembly when moving the carrier backwards.

Figure 8:
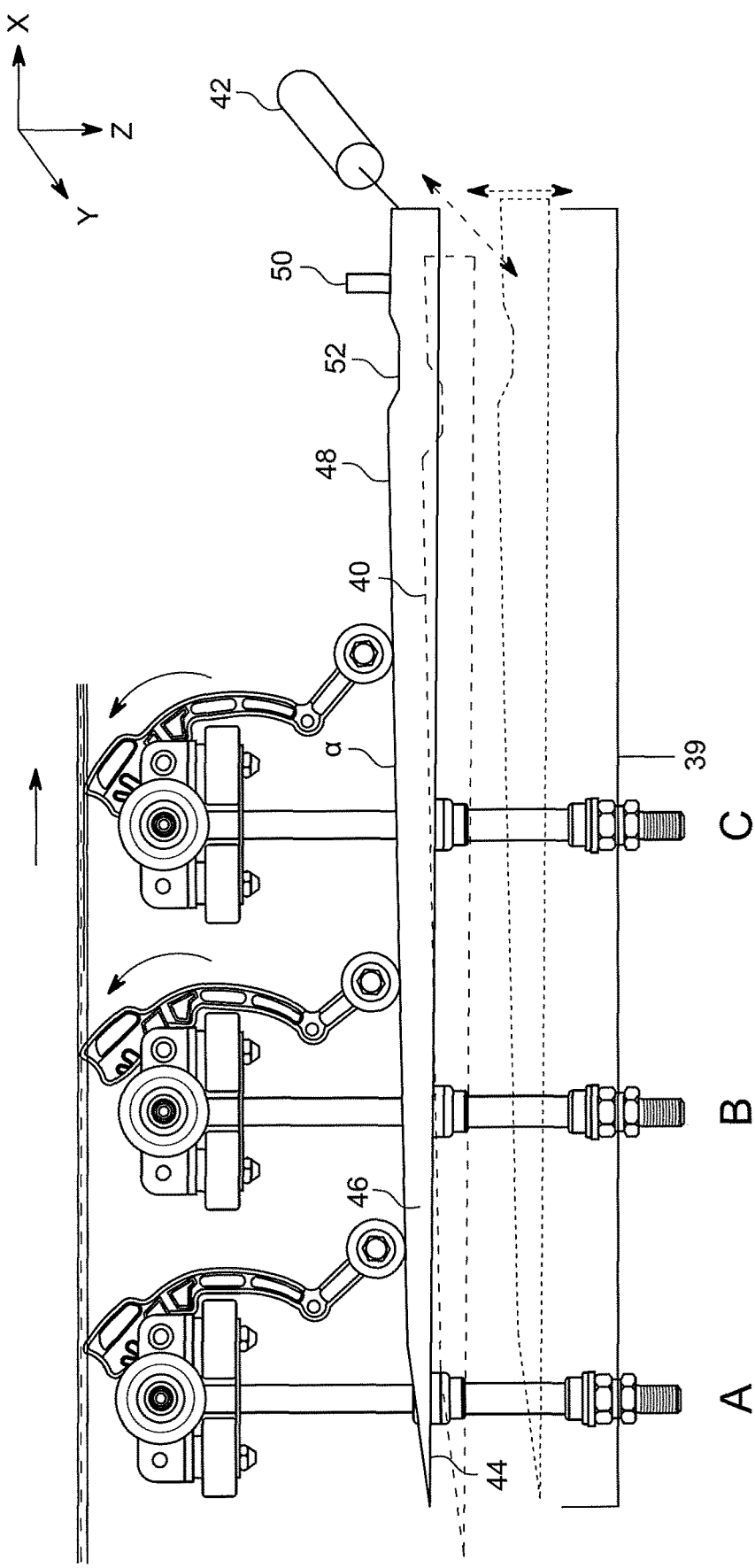
FIG. 8 is a perspective view of part of a system with a parking area in accordance with the present invention.

In conveyor systems it often desirable to provide parking areas 39 when one or more drive carriages can be temporarily held stationary before proceeding onto a further section of the conveyor system. In order to reduce wear on the friction shoe and impact forces it is desirable that when a drive carrier is stationary then there is no contact between the friction shoes of the carriers and the drive belt while at the same time a positive drive to the parking position can be ensured. This can be achieved, as shown in FIG. 8, by providing a laterally movable (as shown by a solid line) and/or vertically movable (as shown by a dashed line) front carrier parking ramp 40 on the side of the conveyor system on which the guide surface of the front carrier will pass, for example on the right side in the direction of travel, at the position where the front carriage is to be parked. The front carrier parking ramp can be moved (preferably laterally) by any suitable activator 42 into a braking position in which the guide surface of an approaching front carrier comes into contact with a lower portion 44 (as shown in position A) of the ramp and then is lifted by the sloping ramp contact surface 46 (as shown in position B) as the drive carriage advances until the it reaches a maximum raised position on a substantially horizontal top surface 48 (as shown in position C) which extends parallel to the drive belt and is positioned so that the friction shoe of the front carrier is no longer in contact with the drive belt. The surface of the front carrier parking ramp can be provided with a stop surface 50 or depression 52 which the guide surface can contact, or drop into, to prevent further forward movement of the front carrier. Such an arrangement provides a positive and steadily decreasing drive from the front carrier to a stop position in the parking area. In order to prevent wear on the friction shoe of the rear carrier while the drive carriage is parked it is preferable to disconnect the friction shoe of the rear carrier from the drive belt. This can be achieved by providing a rear carrier parking ramp on the other side, e.g. the left side, of the conveyor system. The contact surface of this rear carrier parking guide that is intended to be in contact with the guide surface of the friction arm assembly of a rear carrier should start at least at the distance L (the distance between the carriers on a drive carriage) before the start of the contact surface of the movable parking ramp on the right side of the conveyor system in order to ensure that the friction shoe of the rear carrier is brought out of contact with the drive belt before or at the same time as the friction shoe of the front carrier. This ensures that only the front friction shoe drives the drive carriage into the parking area. Preferably the rear carrier parking ramp is provided with a preferably horizontal extension in the direction of travel of a length E which preferably is equal to or greater than 25%, more preferably equal to or greater than 50% and even more preferably equal to or greater than 100% of the length L to maintain the friction shoe of the rear carrier out of contact with the drive belt at least as it enters the parking area and passes though the beginning of the parking area. If the parking area is intended to accommodate more than one drive carriage, for example N drive carriages, then the rear carrier parking ramp can be positioned N times the length L of a drive carriage before the front carrier parking ramp and the horizontal extension can extend the distance H in the direction of travel. The rear parking ramp and any extension preferably are fixed but they may be transversely and/or vertically movable.

When it is desired that a parked drive carriage is to leave the parking area the front carrier parking ramp is moved out of contact with the guide surface of the front carrier. This allows the guide surface of the front carrier to fall and the friction shoe to rise and contact the drive belt, thereby re-establishing friction drive to the front carrier and moving the drive carriage forward. As it moves forward the guide surface of the rear carrier will leave the rear carrier parking ramp and any extension of it, thereby re-establishing drive to the drive carriage via the rear carrier friction arm assembly.

It is desirable to reduce the impact forces when a moving second drive carriage approaches and contacts a stationary or slower moving drive carriage in front of it. This can be achieved by providing the rear portion of drive carriage 13 with a rearwardly projecting drive disconnection plate 60 as shown in FIG. 3. The drive disconnection plate has a sloping contact surface 62 which projects sufficiently far backwards and is so shaped that when a second drive carriage approaches the rear of a first drive carriage (for example a stationary drive carriage) the guide surface 26 of the front carrier 14 of the second drive carriage slides up the ramp which causes the upper end of the friction arm assembly and the friction shoe to pivot away from the drive belt and disconnect the friction drive between front carrier and the drive belt in a similar fashion to a parking ramp described above. If this occurs in a parking area which is intended to accommodate N drive carriages and there are less than N drive carriages in the parking area, then the rear friction shoe of the newly arriving drive carriage can be disconnected from the drive belt by a rear carrier parking ramp as described above.

When a carrier is being driven up a slope by an inclined drive belt the inclination of the friction arm assembly will increase the horizontal distance of the centre of gravity of the friction arm assembly away from the axis about which it pivots, thereby increasing the moment of the friction arm assembly around this pivot and increasing the contact force between the friction shoe and the friction belt. This increase the drive force when it is needed most and prevents slippage between the friction shoe and drive belt when carrying a load up a slope.

If additional friction is needed between the friction shoe and the drive belt, for example on a slope, the conveyor system can be provided with a drive force increasing surface which forces the guide surface on the friction arm assembly downwards so that the friction shoe is forced upwards with increased force against the drive belt.

When descending a slope, the converse will happen and the contact force between the friction shoe and drive belt will decrease. In order to prevent the drive carrier from descending out of control it is possible to provide braking means. One form of braking means is to provide a permanent constriction in the girder so that the inner walls of the boxlike girder contact the guide wheels of the carriers with more force and thereby increase the rolling friction, thereby braking the carrier, Temporary braking can be achieved by providing an actuator which can be activated to bring the inner walls of the girder and thus the rails closer together, thereby reducing the width W of the slot. Another way of controlling the speed of a drive carrier during a descent is to increase the friction between the drive belt and friction shoe of a carrier. This can be achieved by providing a drive friction-increasing contact surface for the guide surface of a carrier. This can be in in the form of a plate, profile or flange or the like arranged parallel to the under surface of the girder at a distance which forces the guide surface of a carrier to move downwards, thereby pivoting the friction shoe towards the drive belt and increasing the contract force. This increased friction prevents slippage between the carrier and the drive element and ensures that the speed of the drive carriage is kept the same as, or close to, the speed of the drive belt.

While the invention has been illustrated by drive carriages with a front and a rear carrier, wherein each carrier is provided with one or two friction arm assemblies, it is conceivable to have a drive carriage with only a single carrier or to use a carrier to support a load directly, without the use of a drive carriage.

The invention claimed is:

1. A carrier for use in an overhead conveyor system comprising an endless drive element for driving a carrier in a forward direction,
   wherein said carrier is provided with an elongated body with a front end and a rear end supporting at least one friction driver,
   wherein said at least one friction driver is in the form of a friction arm assembly with an upper end and a lower end, and said upper end comprising a friction shoe,
   wherein said friction arm assembly is arranged to pivot with respect to the carrier around a horizontal pivot axis arranged substantially transverse to the longitudinal axis of the elongated body, and
   wherein said friction shoe is biased upwards by the force of gravity due to:
   i) the centre of gravity of the friction arm assembly being below the horizontal pivot axis and/or,
   ii) the centre of gravity of the friction arm assembly being displaced in one direction along the longitudinal axis of the elongated body from the horizontal pivot axis while the friction shoe is displaced in the opposition direction along the longitudinal axis of the body from the horizontal pivot axis.

2. The carrier according to claim 1, wherein the lower end of said friction arm assembly comprises a guide surface positioned to one side of said longitudinal axis of the carrier.

3. The carrier according to claim 1, wherein the centre of gravity of said friction arm assembly is a horizontal distance from the centre of said horizontal pivot axis in the forward longitudinal direction of the elongated body away from the elongated body, and the friction shoe is on the opposite side of the horizontal pivot axis in said longitudinal direction.

4. The carrier according to claim 3, wherein the horizontal distance from the centre of gravity of the friction arm assembly and the centre of the horizontal pivot axis is greater than or equal to 1 mm.

5. The carrier according to claim 3, wherein the horizontal distance from the centre of gravity of the friction arm assembly and the centre of the horizontal pivot axis is greater than or equal to 3 mm.

6. The carrier according to claim 3, wherein the horizontal distance from the centre of gravity of the friction arm assembly and the centre of the horizontal pivot axis is greater than or equal to 5 mm.

7. The carrier according to claim 1, wherein the centre of gravity of said friction arm assembly is a vertical distance V below the centre of said horizontal pivot axis.

8. The carrier according to claim 1, wherein the carrier comprises a front friction arm assembly and a rear friction arm assembly, wherein the centre of gravity of the rear friction arm assembly is to the rear of the horizontal pivot axis for the rear friction arm assembly.

9. The carrier according to claim 8, wherein the centre of gravity of the front friction arm assembly is in front of the horizontal pivot axis for the front friction arm assembly.

10. A drive carriage comprising at least one carrier according to claim 1, wherein said drive carriage comprises a rear portion and said rear portion comprises a rearwardly projecting drive disconnection plate on one side of the longitudinal axis of the drive carriage.

11. The drive carriage according to claim 10, wherein said drive carriage comprises a longitudinally extending frame of length which supports at least a front carrier and a rear carrier which are arranged in a fixed spaced-apart relationship a predetermined distance apart in the longitudinal direction of the frame and wherein the guide surface of the front carrier is on the same side of the longitudinal axis of the frame as said rearwardly projecting drive disconnection plate.

12. The drive carriage according to claim 11, wherein the guide surface of the rear carrier is on the opposite side of the longitudinal axis of the frame to the front carrier.

13. An overhead conveyor system with an elongate box girder having a first inner space with rails separated by a slot-like opening of width, and a longitudinally extending inner space comprising a driven, endless drive element arranged above said rails and wherein said overhead conveyor system comprises a carrier according to claim 1 adapted to run on said rails.

14. The overhead conveyor system according to claim 13, wherein the system comprises a parking area comprising a laterally and/or vertically movable front carrier parking ramp on the side of the conveyor system on which the guide surface of a front carrier will pass.

15. The carrier according to claim 1, wherein the horizontal distance from the centre of gravity of the friction arm assembly and the centre of the horizontal pivot axis is greater than or equal to 10 mm.

16. The carrier according to claim 1, wherein the centre of gravity of said friction arm assembly is a vertical distance V below the centre of said horizontal pivot axis, wherein V is equal to or greater than 5 mm.

17. The carrier according to claim 1, wherein the centre of gravity of said friction arm assembly is a vertical distance V below the centre of said horizontal pivot axis, wherein V is equal to or greater than 10 mm.

18. The carrier according to claim 1, wherein the centre of gravity of said friction arm assembly is a vertical distance V below the centre of said horizontal pivot axis, wherein Vis equal to or greater than 15 mm.

* * * * *